(12) United States Patent   (10) Patent No.: US 8,452,806 B2
Gurnani et al.                   (45) Date of Patent:      May 28, 2013

(54) AUTOMATIC CATALOG SEARCH PREVIEW

(75) Inventors: Sailesh Gurnani, San Francisco, CA (US); Andrew Lottmann, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 96 days.

(21) Appl. No.: 12/912,474

(22) Filed: Oct. 26, 2010

(65) Prior Publication Data

US 2012/0102062 A1    Apr. 26, 2012

(51) Int. Cl.
    *G06F 7/00*         (2006.01)
(52) U.S. Cl.
    USPC ............................ 707/769; 707/684; 707/802
(58) Field of Classification Search ................... 707/769, 707/684, 802
    See application file for complete search history.

(56) References Cited

U.S. PATENT DOCUMENTS

| 7,725,471 | B2 * | 5/2010 | Weinberg et al. ............. 707/740 |
| 2005/0216448 | A1 * | 9/2005 | Talib et al. ........................ 707/3 |
| 2007/0259650 | A1 * | 11/2007 | Felder ........................ 455/412.1 |
| 2009/0089248 | A1 * | 4/2009 | Alexander et al. ................ 707/3 |

* cited by examiner

*Primary Examiner* — Cindy Nguyen
(74) *Attorney, Agent, or Firm* — Marc S. Kaufman; Gerard M. Donovan; Reed Smith LLP

(57) ABSTRACT

A computer-implemented method for navigating a database including a plurality of records having attributes, the method including transmitting a webpage configured to display selectable filters associated with record attributes; receiving at least one attribute value based on a filter selection; transmitting a mini query to the database for a count of records in the database that satisfy the at least one attribute value; receiving the count of records; transmitting the count of records to be rendered on a display device; transmitting a full query to the database for record indicators in the database that satisfy the at least one attribute value; receiving the one or more record indicators; and transmitting the one or more record indicators.

18 Claims, 10 Drawing Sheets

AUTOMATIC CATALOG SEARCH PREVIEW

BACKGROUND

Many websites are configured as online catalogs. These catalogs act as alternatives to traditional paper catalogs and offer enhanced navigational features when compared to their paper counterparts as well as the advantages of broad, easy distribution. Through the Internet, the market base of manufacturers and resellers may be maximized while associated overhead may potentially be drastically reduced. Well-organized electronic catalogs help consumers make good purchasing decisions by providing extensive information about products in an easy-to-navigate manner. Such catalogs allow consumers to gain information about products and to purchase products directly. Additionally, such catalogs serve as a site where companies may purchase advertising to market their products.

Electronic catalogs generally store, in a database, information about a number of products which may be, for example, electronics, housewares, apparel, digital content, or any other type of item which may be depicted and/or described electronically. Such items may be described by a taxonomy, which describes the set of products with a set of information that consists of a set of attributes that assume values. That is, each product may be associated with a price, brand, and other attributes. Some attributes may only be stored for some classes of product. For example, weight might be an attribute of laptops, but not desktop computers, while both might have a processor speed attribute.

Once a retailer or other content provider has provided a taxonomy for its products, it remains for the users of the catalog system to retrieve the products using the taxonomy system. One way to do this is by performing searches using filters. Filters may be composed of product attributes and possible attribute values which a user may select to narrow the products in a taxonomy. Such filters constrain the allowable values of the attributes, and thereby generate a more manageable subset of the products that the user may use, manipulate, and digest.

Filters allow the users to reduce the potentially huge numbers of products which otherwise occupy catalogs and reduce them to manageable numbers. They also allow users to focus their searches to meet their individualized needs, as well as incorporate factors such as ability to pay or brand requirements due to purchasing contracts. However, conventional electronic catalogs prevent a user from knowing to what extent selection of a filter attribute value will affect a set of search results. A user may filter an electronic catalog to such an extent that no products match the user's selected attribute values. Likewise, a user may select an attribute value that insufficiently narrows or fails to narrow a set of search results at all. These results can be inconvenient to a user and prolong the search or filter process.

Websites such as AMAZON.COM™ and EBAY.COM™ provide filters that allow a user to focus their searches by selecting attribute values. For the convenience of a user, both AMAZON.COM™ and EBAY.COM™ provide a count after attribute values indicating how many records satisfy that filter. For example, a search for "Hemingway" on AMAZON.COM™ that generated 6,724 results provided filters to narrow the results. An attribute "Books" included values such as "Literature & Fiction (3,056)" and "Reference (239)" and an attribute "Binding" included values such as "Paperback (2,584)" and "Board Book (12)", with the parenthetical number indicating a count of records satisfying a filter. Likewise, a search for "Hemingway" on EBAY.COM™ that generated 1,906 results provided filters to narrow the results. An attribute "Books (1,680)" included values such as "Fiction & Literature (609)" and "Nonfiction (578)" and an attribute "Buying Formats" included "Auction" and "Buy it Now".

While it may be convenient for a user to see a static count of records satisfying each filter before the user selects a filter, additional processing time may be required to generate counts of records satisfying each filter before displaying the results of the user search. Additionally, because products may quickly sell out, the static count of records satisfying a filter may be inaccurate by the time a user decides to select a filter. Further, the static number of records satisfying a filter provides no indication of how many records may satisfy a combination of filters. For example, while a search of AMAZON.COM™ for "Hemingway" resulted in 12 books having the value "Board Book" for the attribute "Binding" and 239 books having the value "Reference" for the attribute "Books", no books satisfy both the filters "Reference" and "Board Book". Thus, a user must focus a search (e.g., drill down) using filters before realizing that a desired combination of filters may have no matching records, too few matching records, or too many matching records.

While the system and method is described herein by way of example and embodiments, those skilled in the art recognize that generating an automatic catalog search preview is not limited to the embodiments or drawings described. It should be understood that the drawings and description are not intended to limit embodiments to the particular form disclosed. Rather, the intention is to cover all modifications, equivalents and alternatives falling within the spirit and scope of the invention defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Disclosed embodiments provide computer-implemented methods and systems for navigating a database of records having attributes. Embodiments may include a user interface ("UI") including a search area, a results area, and a preview area. The search area may be configured to allow a user to search or filter the records in a database according to values of attributes of the records. The results area may be configured to display to a user a record indicator including one or more attributes of a record and corresponding attribute values. The preview area may be a tool tip or preview box configured to show a count of records corresponding to a filter selection (i.e., records having an attribute value corresponding to a filter).

Figure 1:
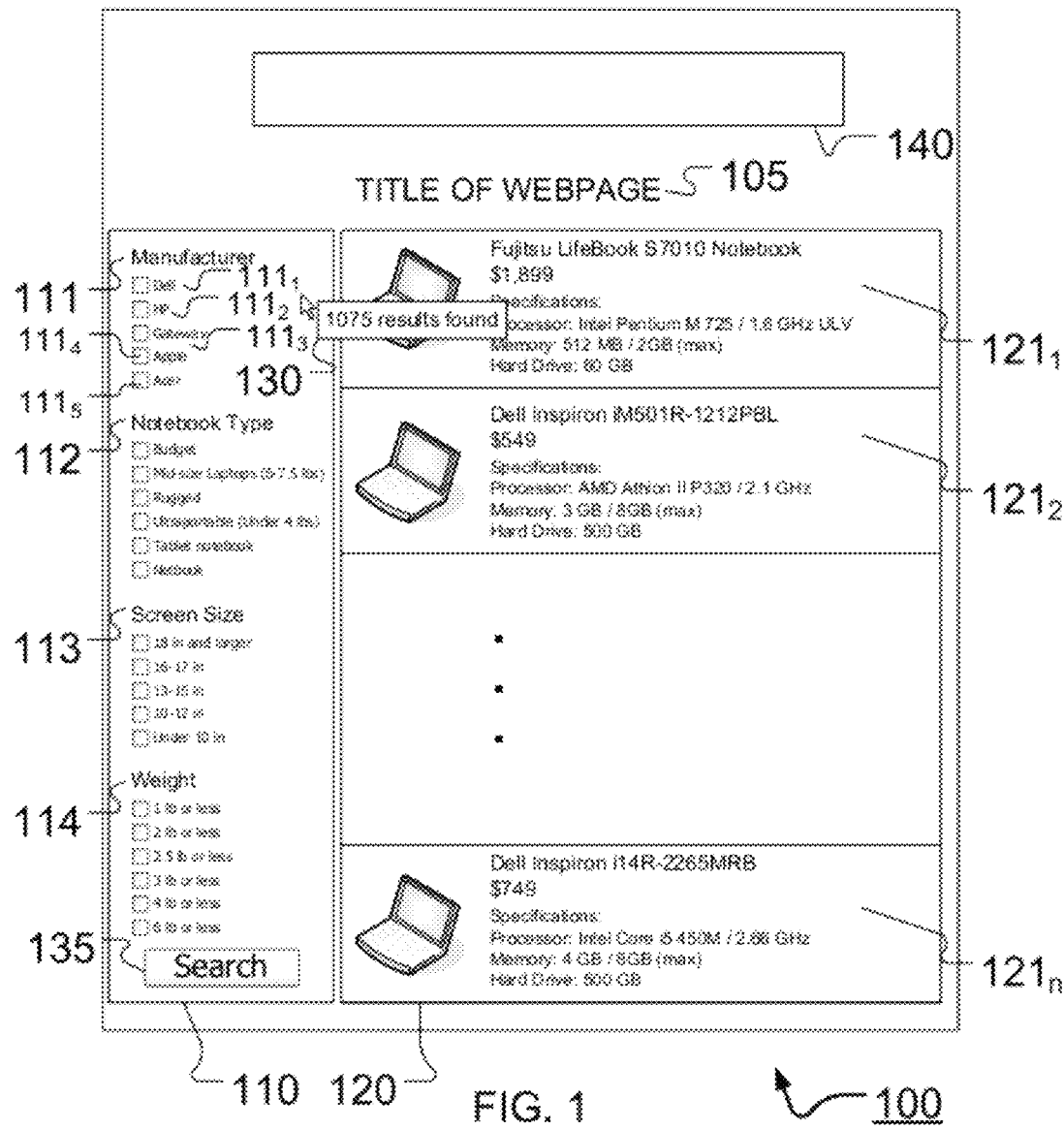
FIG. 1 is a schematic illustration of an exemplary webpage used as an interface for an electronic catalog.

FIG. 1 is a schematic illustration of an exemplary webpage 100 used as an interface for an electronic catalog. Web page 100 may be rendered in a conventional browser. Webpage 100 includes a search area 110, a results area 120, and a preview area 130. For example, the electronic catalog shown in FIG. 1 includes a plurality of records corresponding to the category of notebook computers. Search area 110 includes one or more notebook computer attributes, for example manufacturer 111, notebook type 112, screen size 113, and weight 114. Associated with each attribute are a plurality of user selectable values of attributes. For example, associated with the attribute manufacturer 111 are values of DELL™ $111_1$, HP™ $111_2$, GATEWAY™ $111_3$, APPLE™ $111_4$, and ACER™ $111_5$. Of course, the attributes and attribute values shown in FIG. 1 are exemplary only, and more, less, or different attributes and/or values may be chosen depending on the purpose of the catalog, for example the product type, expected users, or any other criteria. The combination of an attribute and a value/range of values/threshold value corresponds to a filter. For example, selecting the attribute manufacturer and the value APPLE™ will filter search results to show only notebook computers manufactured by APPLE™.

FIG. 1 shows attribute values configured to allow a user to select a value by clicking a checkbox. Of course, other embodiments may allow a user to select a value using other UI controls, for example radio button boxes, drop down menus, hyperlinks, and the like. In some embodiments checkboxes may allow a user to select a plurality of values for a single attribute, for example a user may check DELL™ $111_1$ and HP™ $111_2$ to review notebook computers made by either manufacturer. In some embodiments radio button boxes may allow a system to prevent a user from selecting overlapping or mutually exclusive attribute values, for example, in an embodiment an attribute weight 114 may have values selectable with radio button boxes because selection of the value 1 lb or less satisfies each of the other selectable attribute threshold values. Embodiments may include additional or alternative UI features to allow a user to easily interact with search area 110.

Results area 120 may display one or more record indicators 121 from the electronic catalog corresponding to selected attribute values. For example, with no attribute values selected in search area 110, results area may display record indicators $121_1$, $121_2$, . . . , $121_n$ where n corresponds to records of all notebook computers in the catalog. Each record indicator may include values of various attributes, for example the product name, price, weight, display size, and image. Each record indicator may be configured to display attribute values particular to that type of product, for example records of notebook computers may show processor, memory, and hard drive values. Of course, FIG. 1 is exemplary only and other embodiments may show other values such as weight, screen size, notebook type, average user rating, or any other attributes and values thereof. Further, each record indicator 121 may include other UI controls, for example to allow a user to directly purchase the product shown in a record indicator 121, to allow a user to add a product to a wishlist, or to compare multiple products.

Typically, for a user to determine how selection of an attribute value will affect the number of records found in an electronic catalog, a user must select an attribute value (or range or threshold value) and filter the products according to that attribute value (or range or threshold value). When used herein, the term "value" includes a discrete value, a range of values, or a threshold value (e.g., less than $100). Navigating selectable filters in this fashion may be time consuming because a user may select several attribute values that have no corresponding records. In this case, each time the user must deselect the attribute value to again broaden the search. For example, if a user selects APPLE™ as a value for the attribute manufacturer of a notebook computer and selects budget as a value for the attribute notebook type, there may be no corresponding records in the catalog that satisfy both filters. Other times a user may select filters that have no affect on the search. For example, a user may select Under 10 inches as a value for the attribute screen size of a notebook computer and then, in an attempt to further narrow the results, select 3 lb or less as a value for attribute weight. In the case where every notebook computer with a screen size under 10 inches weighs 3 lb or less, this filter selection does not assist the user in narrowing the records in the catalog. The results for each search require processing the query against the catalog records, thus taking significant time and reducing the interactivity of the catalog.

Figure 2:
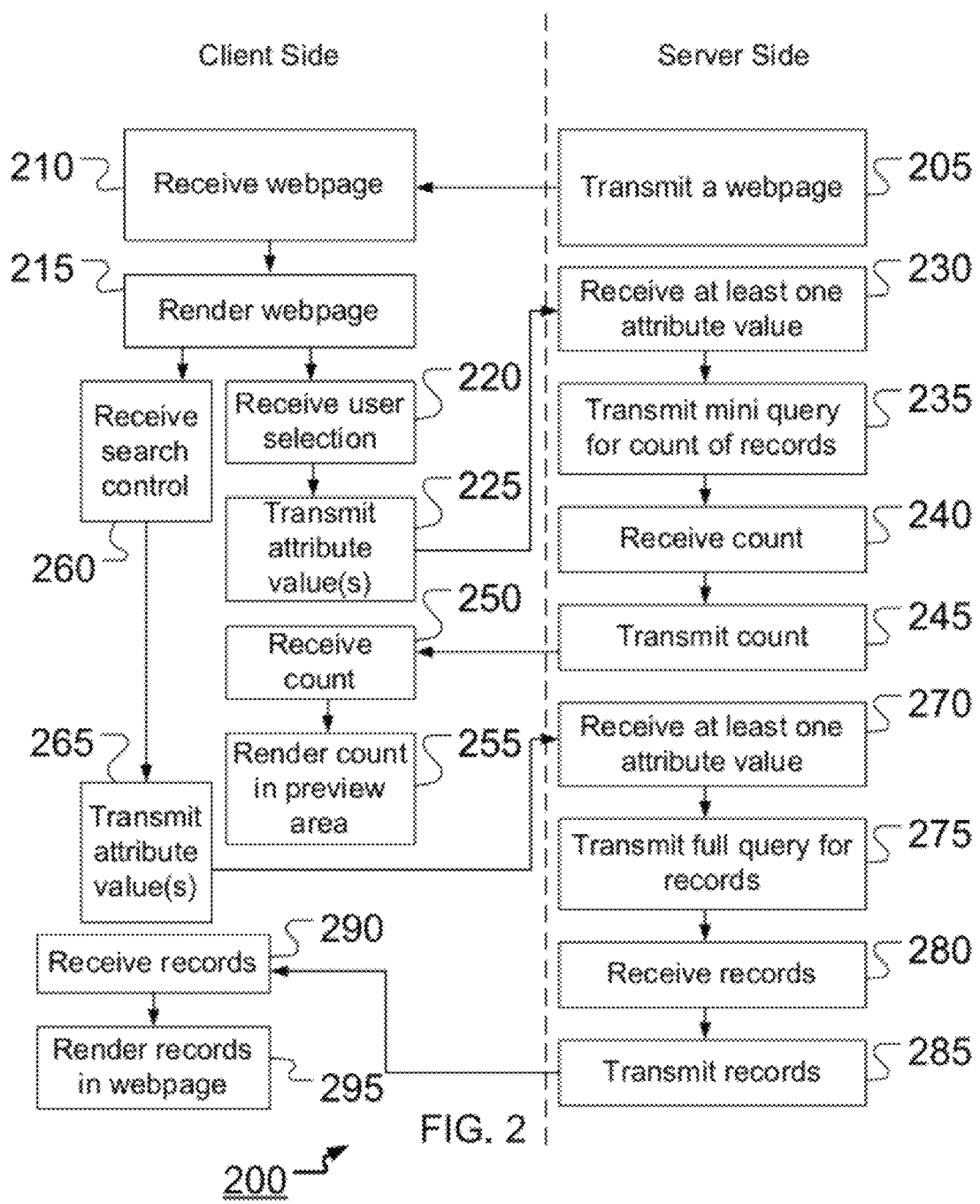
FIG. 2 is a flow chart illustrating a process for generating a count of records that satisfy a set of attribute values.

To assist a user with navigation of a catalog, a preview area 130 may allow a user to see a count of records that would satisfy a set of selected filters before performing a search. For example, FIG. 2 is a flow chart illustrating a process 200 for generating a count of records that satisfy a set of attribute values.

At step 205 of process 200, a computing device transmits a webpage, for example webpage 100 of FIG. 1, which may include a search area and a results area. The computing device transmitting the webpage may be a hypertext transfer protocol ("HTTP") server, for example an Apache server utilizing Lucene software. A computing device then receives at least the webpage at step 210. The computing device receiving the webpage may be a client computing device, for example a personal computer ("PC"), notebook PC, mobile phone (e.g., smartphone), tablet PC, set top box ("STB"), personal digital assistant ("PDA"), thin device, or any other computing device configured to receive and display a webpage. Typically, such a computing device may have a browser. At step 215, a computing device renders a webpage, for example a webpage including a search area and a results area. At step 220, a computing device receives a user selection of an attribute value, for example the computing device may receive user input though a user input device (e.g., a mouse) indicating that the user selects or deselects an attribute value in the search area of the webpage. At step 225, a computing device transmits one or more attribute values. For example, webpage 100 of FIG. 1 may include instructions (e.g., HTML code, JavaScript code, asynchronous JavaScript and XML ("AJAX") code, etc.) instructing a computing device to automatically transmit an attribute value to a computing device when a user interacts with (e.g., selects, such as checking or un-checking) an attribute value.

At step 230, a computing device receives at least one attribute value. At step 235, a computing device transmits a mini query (e.g., sends an SQL query) to a database (e.g., a relational database, a flat database, or any other database), such as a catalog of products organized according to a taxonomy, for a count of records that correspond to the selected attribute values. At step 240, a computing device receives, in response to the mini query, a count of records corresponding to the selected attribute values. At step 245, a computing device transmits the count of records corresponding to the selected attribute values to a computing device to be rendered in a webpage. At step 250, a computing device receives the count of records. At step 255, a computing device renders the count of records in a preview area of a webpage.

Figure 3:
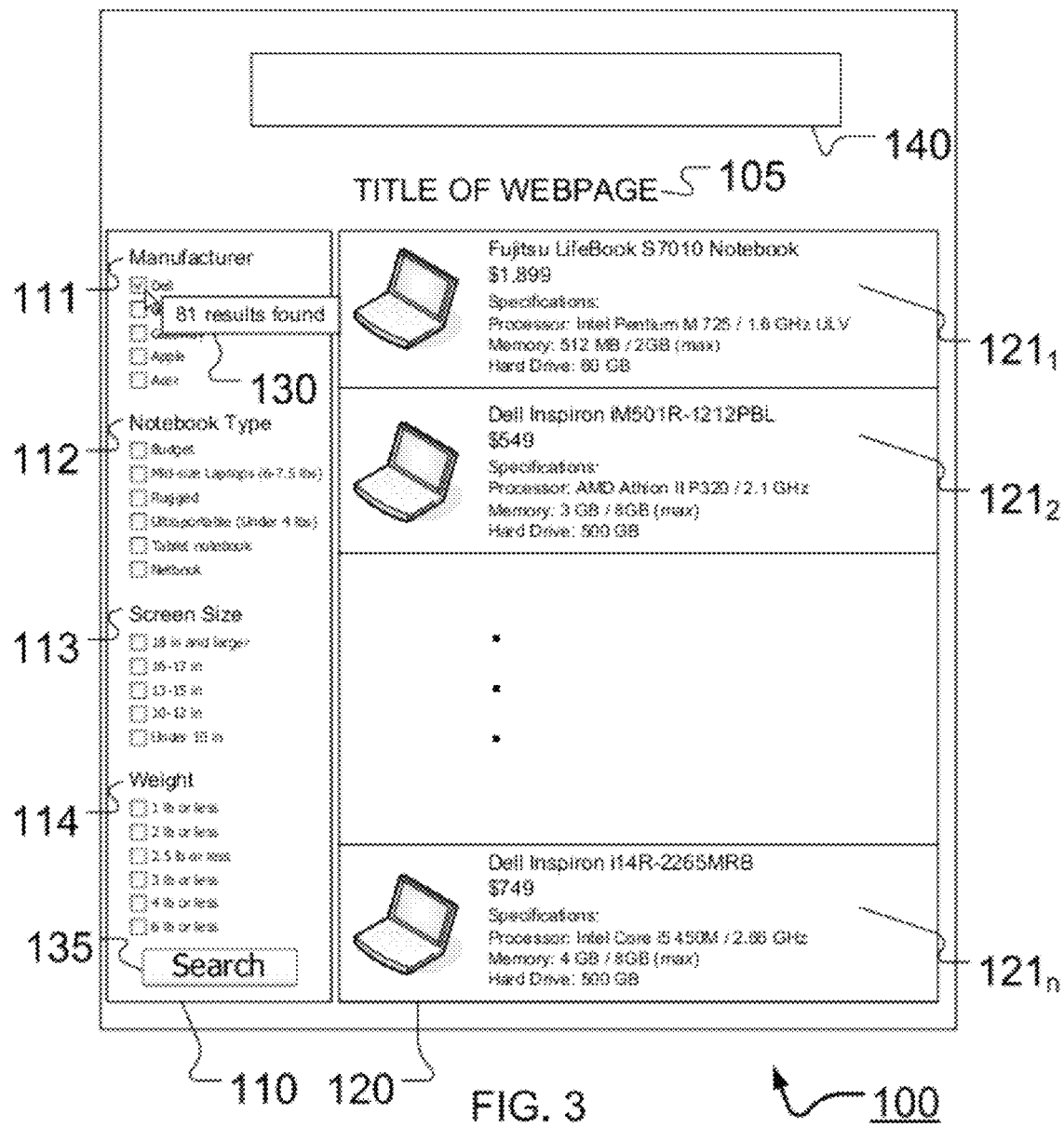
FIG. 3 is a schematic illustration of an exemplary webpage used as an interface for an electronic catalog with an attribute value selected.

For example, a user may select attribute value DELL™ 111$_1$ shown in FIG. 1, for example, by clicking on the corresponding checkbox with a mouse pointer, as shown in FIG. 3. The computing device rendering webpage 100 may then, in response to the user's selection (e.g., checking or un-checking a check control) of an attribute value, send one or more selected attribute values to a computing device, for example a web server. The computing device may then transmit a mini query to a database for a count of records corresponding to the filter selection, for example either by transmitting a mini query directly to a local database or by transmitting a mini query to a remote computing device (e.g., over a network) having access to a database. In response to the mini query, a computing device may receive a count of records corresponding to the attribute value selection, including one or more attributes and attribute values of the records, and transmit the count of records to the computing device rendering webpage 100. Webpage 100 may then update preview area 130 to reflect the count of records that have the attribute values selected by a user. For example, FIG. 3 shows that the catalog includes record indicators of 81 DELL™ notebook computers. If a user then wants to narrow the record indicators in results area 120 to show only DELL™ notebook computers, the user may select search control 135.

Figure 4:
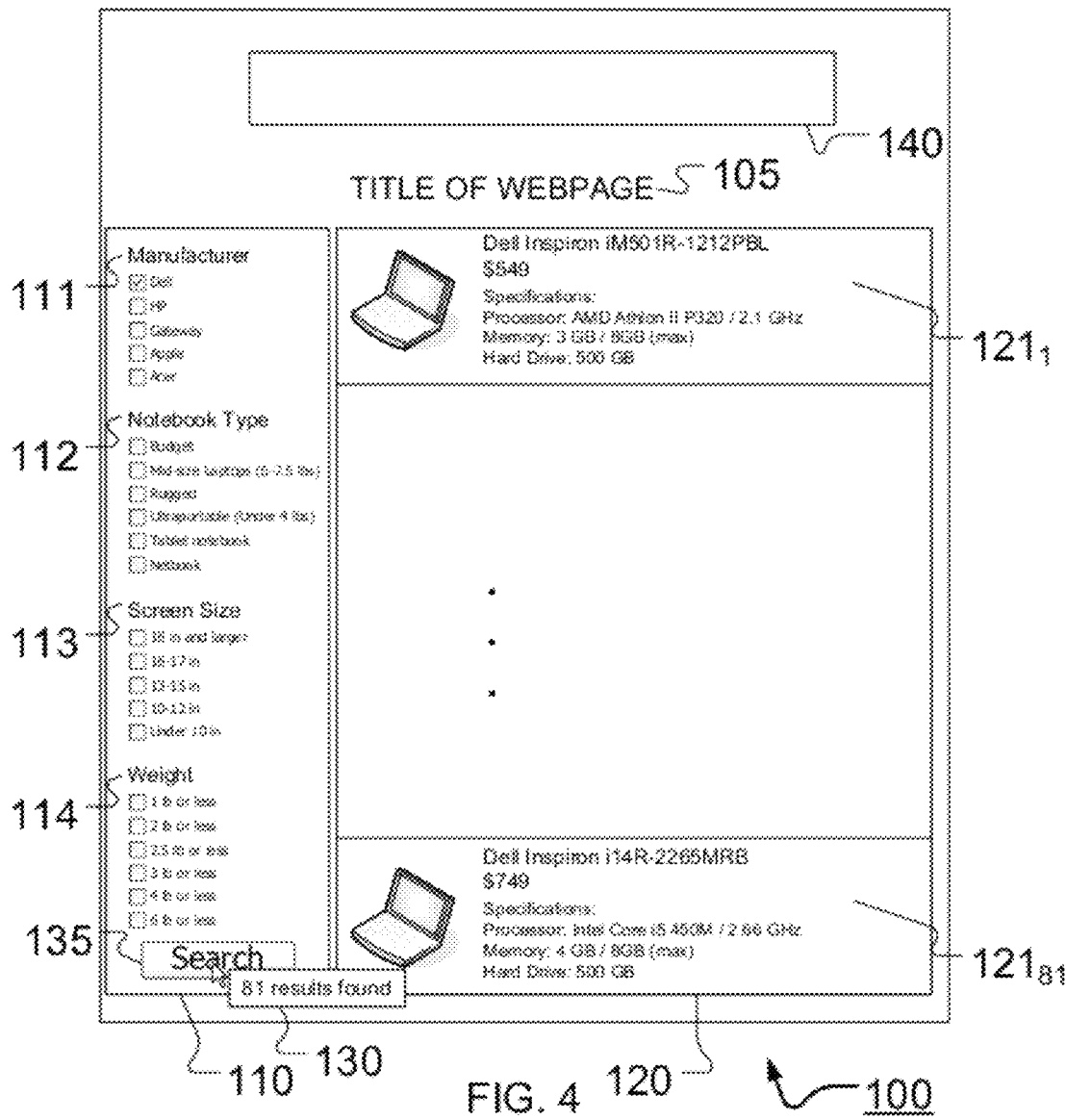
FIG. 4 is a schematic illustration of an exemplary webpage used as an interface for an electronic catalog with an attribute value selected and a search control selected.

In response to receipt of a user's selection of search control 135 at step 260, a full query may be performed according to a user's selection of one or more attribute values for record indicators corresponding to those attribute values. At step 265, the computing device rendering webpage 100 may, in response to the user's selection of search control 135, send all selected attribute values to a computing device, for example a web server. At step 270, a computing device may receive at least one attribute value corresponding to the user's filter selection. At step 275, a computing device may then transmit a full query to a database for records corresponding to the received at least one attribute, for example either by directly transmitting a full query to a local database or by transmitting a full query to a remote computing device having access to a database. In response to the full query, at step 280 a computing device may receive record indicators corresponding to the attribute value selection and, at step 285, transmit the record indicators to the computing device rendering webpage 100. Webpage 100 may then receive record indicators at step 290 and, at step 295, update results area 120 to show record indicators that have the attribute values selected by a user. For example, FIG. 4 shows that the catalog includes records of 81 DELL™ notebook computers and displays record indicators of DELL™ notebooks 121$_1$ through 121$_{81}$ in results area 120.

Embodiments may utilize software modules, for example Lucene software modules, executed on a computing device, to search hashes and/or bit streams in a data store to determine a count of records corresponding to a mini query and to retrieve records corresponding to a full query. For a mini query, a software module may search all records in a data store to determine which records match a query (i.e., which records have one or more attribute values matching the query) and return a unique identifier (e.g., a hash or index value) corresponding to each record matching the query. A software module may then count (i.e., sum up) each of the unique identifiers and the count (i.e., total) may be returned in response to the mini query.

Likewise, a full query may initially have a software module search all records in a data store to determine which records match a query and return a unique identifier (e.g., a hash or index value) corresponding to each record matching the query. After receiving the unique identifiers, a software module may retrieve each record identified by the unique identifiers. After receiving the records, a software module may perform post processing, for example sorting the records. After post processing, a software module may return the records in response to the full query. Of course, identical steps may not be performed by both the mini query and the full query but rather may be shared between the queries. For example, a single initial search of all records in a data store to determine which records match a query and returning a unique identifier may only be performed once and the unique identifiers may be then used for both determining a count and retrieving records.

Of course, other embodiments may include an index, for example stored as one or more software modules, having multiple logical data sets, for example a data set of meta data including filters for each category and a data set of product data. The meta data set may provide plural ontology nodes and a set of filters associated with each node, for example in a tree structure. The product data set may include attribute values related to a product, and the attribute values may also be identifiable by filter values provided by the meta data set. When a user selects a category, the index can be queried to return the attributes and values associated with the selected category for display in a user interface, return a count of products in the category, and/or return product identifiers indicating the products in the category.

For example, when a user selects a filter value, for example by clicking on a selectable filter, the following queries may be performed. The embodiment may query a plurality of ontology nodes in a meta data set and return each filter associated with an ontology node as well as values associated with the filter. For example, in response to a user selecting "camera" in a list of products, an ontology node identifying the camera (e.g., nodeID=114) may be identified and the meta data set may be queried for related selectable filters (i.e., filters and corresponding filter values). A logical data set of identified selectable filters (i.e., sub-filters) may then be returned (e.g., brand:hp, brand:sony, brand:olympus, price:[0-100], price: [100-200], price:[200-300], etc.). Additionally, the user's selection of "camera" may cause a query of the product data set for records associated with "camera" (e.g., having camera as an attribute value or having a match in a free language search for "camera") and unique identifiers for each of the associated records may be returned. A count of the records matching "camera" may then be determined by summing the returned unique identifiers. Product identifiers for records in the product data set associated with "camera" may also be retrieved and returned. Thus, selection of a product in a filter list may cause, for example in the embodiment shown in FIG. 3, the selectable filters shown in search area 110 to be returned from a query of the meta data set and displayed, the count shown in preview box 130 to be retrieved and summed from the product data set, and the product identifiers shown in record area 120 to be retrieved from the product data set.

In the "camera" example given above, a selectable filter is associated with a category of products. In embodiments, selectable filters may be associated with categories of products (e.g., cameras, computers, etc.), sub-categories of products (e.g., laptops and desktops may be sub-categories of computers), or attribute values of products (e.g., screen size and weight may be attribute values of a laptop sub-category while form factor and number of drive bays may be attributes of a desktop). Of course, a taxonomy of products may have many more levels or tiers and may take the form of a tree structure. A user interface may display any combination of selectable filters from different levels in a taxonomy, for example the same user interface may include selectable filters directed toward categories, sub-categories and/or product attributes values. User interface features, such as expandable/collapsible tree navigation controls (e.g., "+" or "expand" and "−" or "collapse" controls on tree branches) may be provided to ease navigation of selectable filters. Of course, attribute values of categories may be sub-categories. For example, attributes of a category "computer" may be "laptop" and "desktop".

As may be observed from the example of FIG. 3, embodiments allow a user to refine their search results before submitting a full query for products corresponding to selected attribute values. For example, a user may decide that 81 results is more information then they want to view or synthesize at once and, thus, may choose additional attribute values to narrow the search. Additionally, because the mini query for a count of records may require less processing steps and, in turn, take less processing time, a user may more quickly and efficiently navigate a catalog by not having to repeatedly perform conventional full queries. Further, because only a single number (i.e., the count) needs to be transmitted in response to the mini query, the count may be quickly returned and displayed on webpage 100. In contrast, because the records, including associated attributes and attribute values, may be several orders of magnitude larger than simply a count of records, the record indicators may take a relatively long time to be displayed on webpage 100, thereby causing the user to wait for the results area 120 to load the record indicators.

Of course, the terms "mini query" and "full query" are used herein for convenience only to differentiate between queries. A "mini query" may be any query for a count of records corresponding to a filter selection (i.e., having one or more attribute values corresponding to the attribute value filters a user selects) or search. A "full query" may be any query for record indicators corresponding to a filter selection or search.

While step 235 of FIG. 2 is described above as transmitting a mini query to a database, the database need not be the catalog of products that may be later be transmitted the full query to return records and their associated attributes and values to webpage 100. Alternatively, records in the catalog may be indexed, or otherwise abstracted, according to one or more of their attribute values and an index value, for example a hash, may uniquely represent records and their associated attribute values. Thus, a database of hashes may be searched rather than a database of products, thereby further decreasing the processing time (i.e., speeding up) of the search.

Of course, any number of computing devices may be involved in the process of providing an automatic catalog search preview. For example, FIG. 2 indicates steps that may be performed on one or more servers ("server side") and steps that may be performed on one or more clients ("client side").

Figure 5:
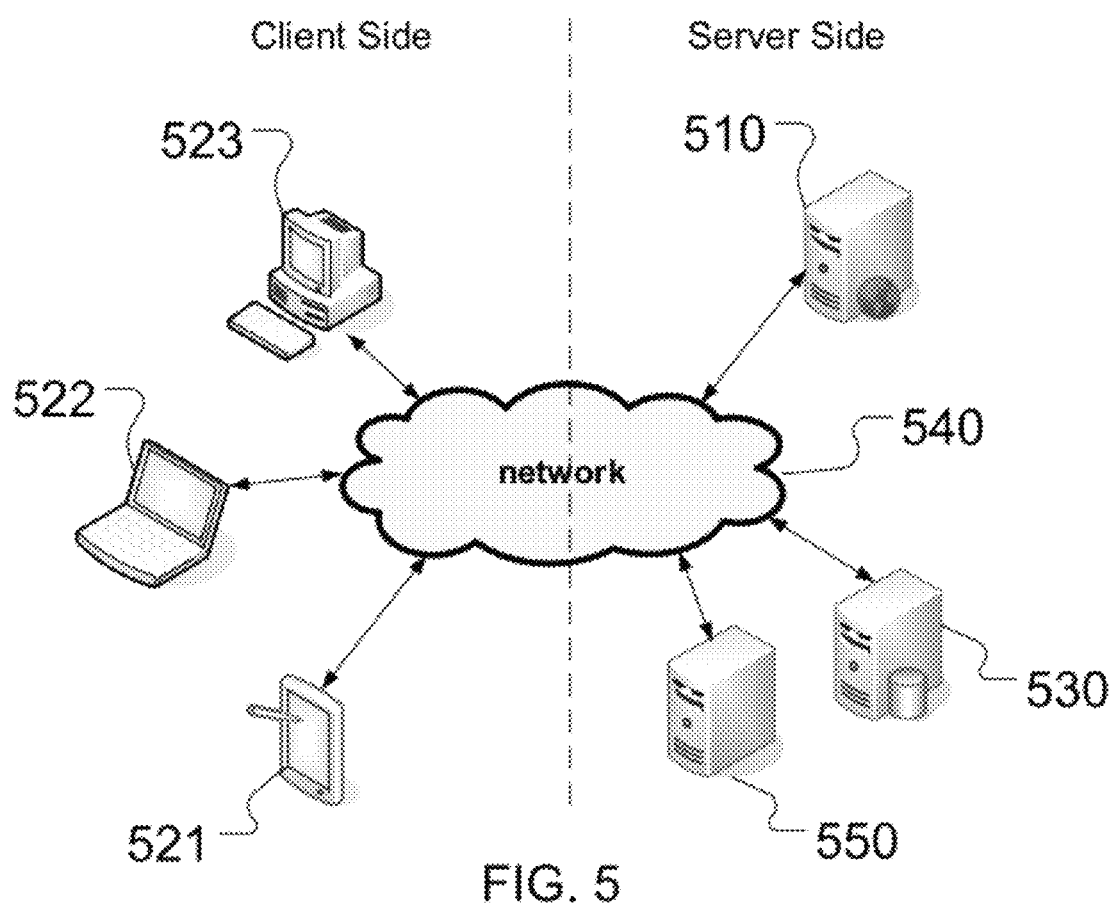
FIG. 5 is a schematic diagram of a computing architecture useful for automatically generating a catalog search preview.

FIG. 5 shows a schematic diagram of a computing architecture useful for performing the steps of exemplary process 200 of FIG. 2. The steps set forth in process 200 on the server side may be performed, for example, by a web server 510 and the steps set forth on the client side may be performed, for example, by a personal computer ("PC") 523, a notebook computer 522, a personal digital assistant ("PDA") 521, or any other computing device. Web server 510 may be a single computing device or a plurality of operatively coupled (e.g., networked) computing devices, for example a server farm, a cluster, etc. At step 210, PC 523 may receive webpage 100 from web server 510 over one or more network 540, for example the Internet. Of course, any other client computing device capable of receiving a webpage may be used, for example a mobile phone, STB, thin device, tablet computer, and the like. When a user selects (e.g., checks or un-checks) a filter (e.g., an attribute value) in an electronic catalog, instructions in the webpage may cause the client computer to send at least one attribute value to web server 510 over network 540. After receiving the one or more attribute from the client, web server 510 may send a mini query to a database server 530 for a count of records having the selected attribute value. Web server 510 may then receive a count of records from database server 530 in response to the mini query and transmit the count of records back to a client computing device. The client computing device may then update a preview area in the webpage to display the count.

Alternatively, at step 235, web server 510 may send a mini query to a local database (e.g., a database stored in memory on web server 510). In response to a local database mini query, at step 240, web server 510 may receive a count of records having the selected attribute values.

Further still, a single computing device may perform all steps of process 200 (e.g., the computing device may host a web server, host a database, and render webpage 100 in a browser). In such an embodiment, transmitting and receiving steps in process 200 may, for example, transmit and receive over a bus within a single computing device rather than over a network, such as shown in FIG. 5.

Of course, more or less computing devices may be involved in other embodiments. Additionally, one of ordinary skill in the art understands that "computing device" may mean more than one computing device (e.g., clustered servers, distributed computing devices (e.g., a cloud), or any other system). One of ordinary skill in the art understands that other combinations of operatively coupled (e.g., networked) computing devices may be useful for performing the steps of process 200.

Figure 8:
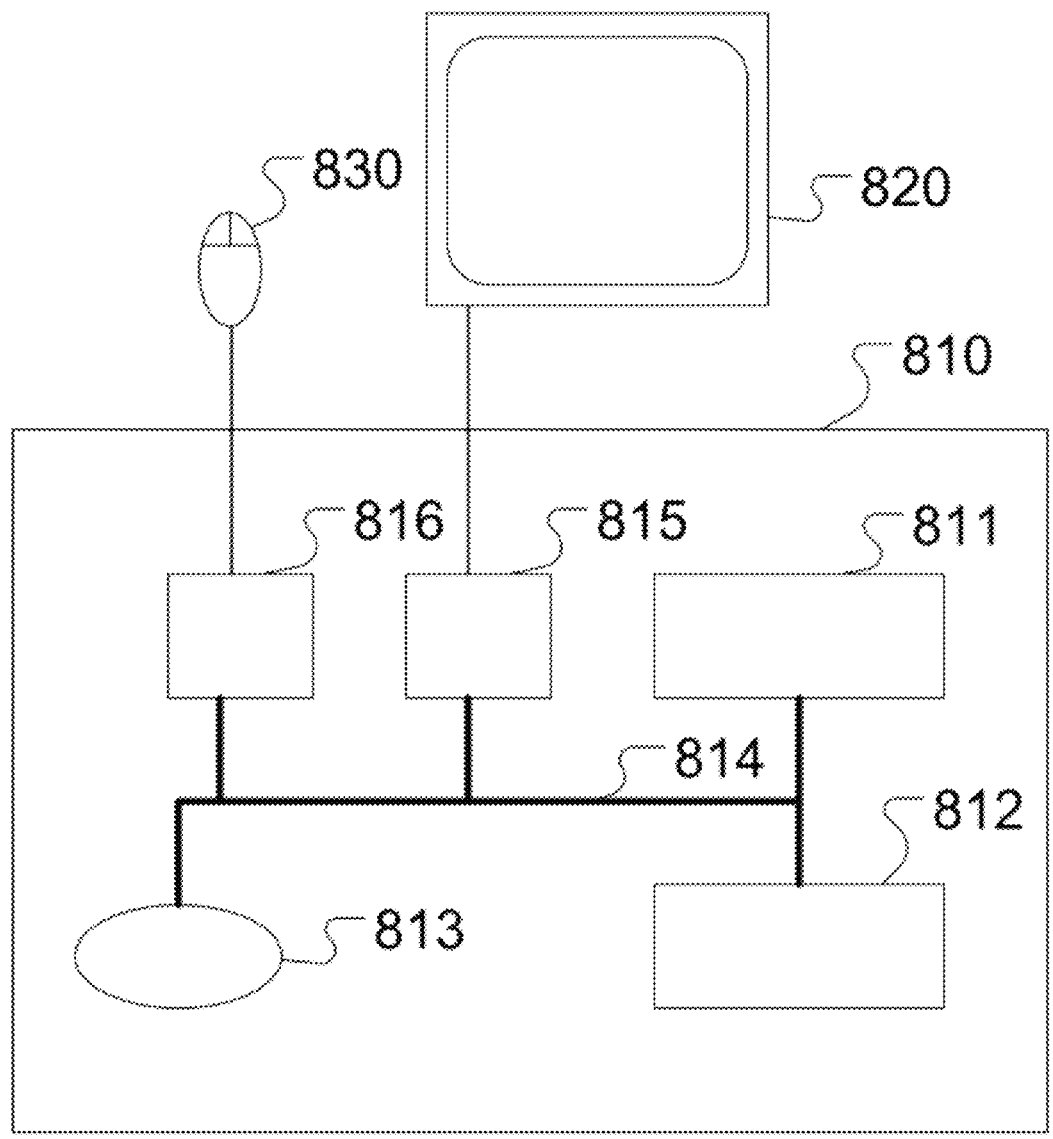
FIG. 8 is a block diagram of an exemplary computing device useful for performing steps set forth in the process shown in FIG. 2.

These embodiments may be implemented with software executed on hardware, for example, functional software modules executed on computing devices such as computing device 810 of FIG. 8. Embodiments may, for example, execute modules corresponding to steps shown in process 200. Of course, a single step may be performed by more than one module, a single module may perform more than one step, or any other logical division of steps of process 200 may be used to implement process 200 as software executed on a computing device.

Computing device 810 has one or more processing device 811 designed to process instructions, for example computer readable instructions (i.e., code) stored on a storage device 813. By processing instructions, processing device 811 may perform the steps set forth in process 200. Storage device 813 may be any type of storage device (e.g., an optical storage device, a magnetic storage device, a solid state storage device, etc.), for example a non-transitory storage device. Alternatively, instructions may be stored in remote storage devices, for example storage devices accessed over a network or the Internet. Computing device 810 additionally has memory 812, an input controller 816, and an output controller 815. A bus 814 operatively couples components of computing device 810, including processor 811, memory 812, storage device 813, input controller 816, output controller 815, and any other devices (e.g., network controllers, sound controllers, etc.). Output controller 815 may be operatively coupled (e.g., via a wired or wireless connection) to a display device 820 (e.g., a monitor, television, mobile device screen, touch-display, etc.) in such a fashion that output controller 815 can transform the display on display device 820 (e.g., in response to modules executed). Input controller 816 may be operatively coupled (e.g., via a wired or wireless connection) to input device 830 (e.g., mouse, keyboard, touch-pad, scroll-ball, touch-display, etc.) in such a fashion that input can be received from a user (e.g., a user may select with an input device one or more attribute values to filter products in an electronic catalog).

Of course, FIG. 8 illustrates computing device 810, display device 820, and input device 830 as separate devices for ease of identification only. Computing device 810, display device 820, and input device 830 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 810 may be one or more servers, for example a farm of networked servers, a clustered server environment, or a cloud network of computing devices, configured to serve web pages and/or ad content.

Figure 6:
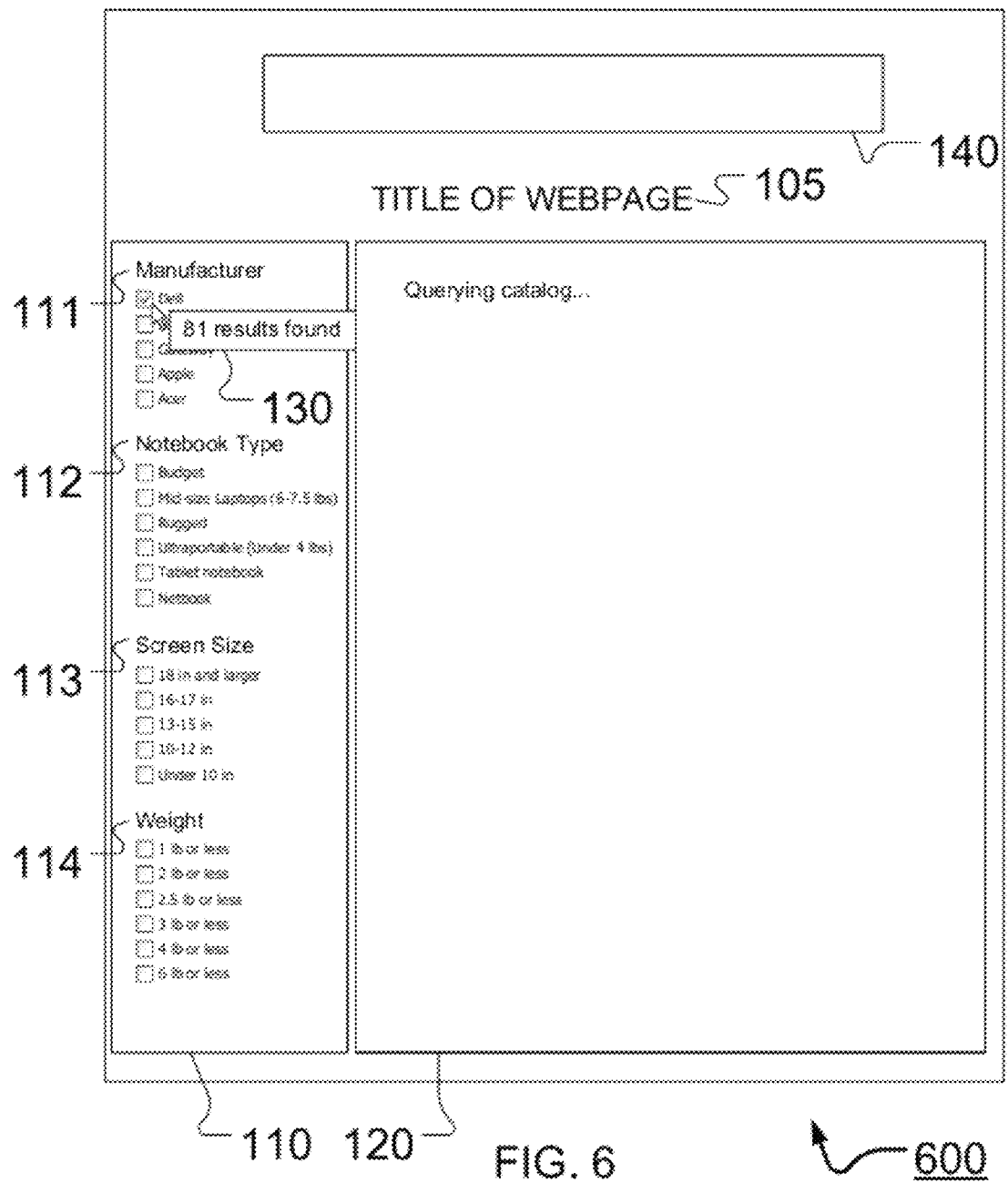
FIG. 6. is a schematic illustration of an exemplary webpage configured to display automatically filtered results in response to a user's selection of an attribute value.

In other embodiments, a webpage, for example webpage 600 shown in FIG. 6, may be configured to instruct a computing device to automatically update results area 120 after receiving user input selecting an attribute value in search area 110. In such embodiments, instructions in the webpage may provide that a computing device first transmits a mini query for a count of records satisfying the attribute value, then a process, for example the process shown in FIG. 2, may be performed causing the webpage to display the count of records, and, after the webpage displays the count of records in preview area 130, a computing device may transmit a full query for record indicators to update results area 120.

Figure 9:
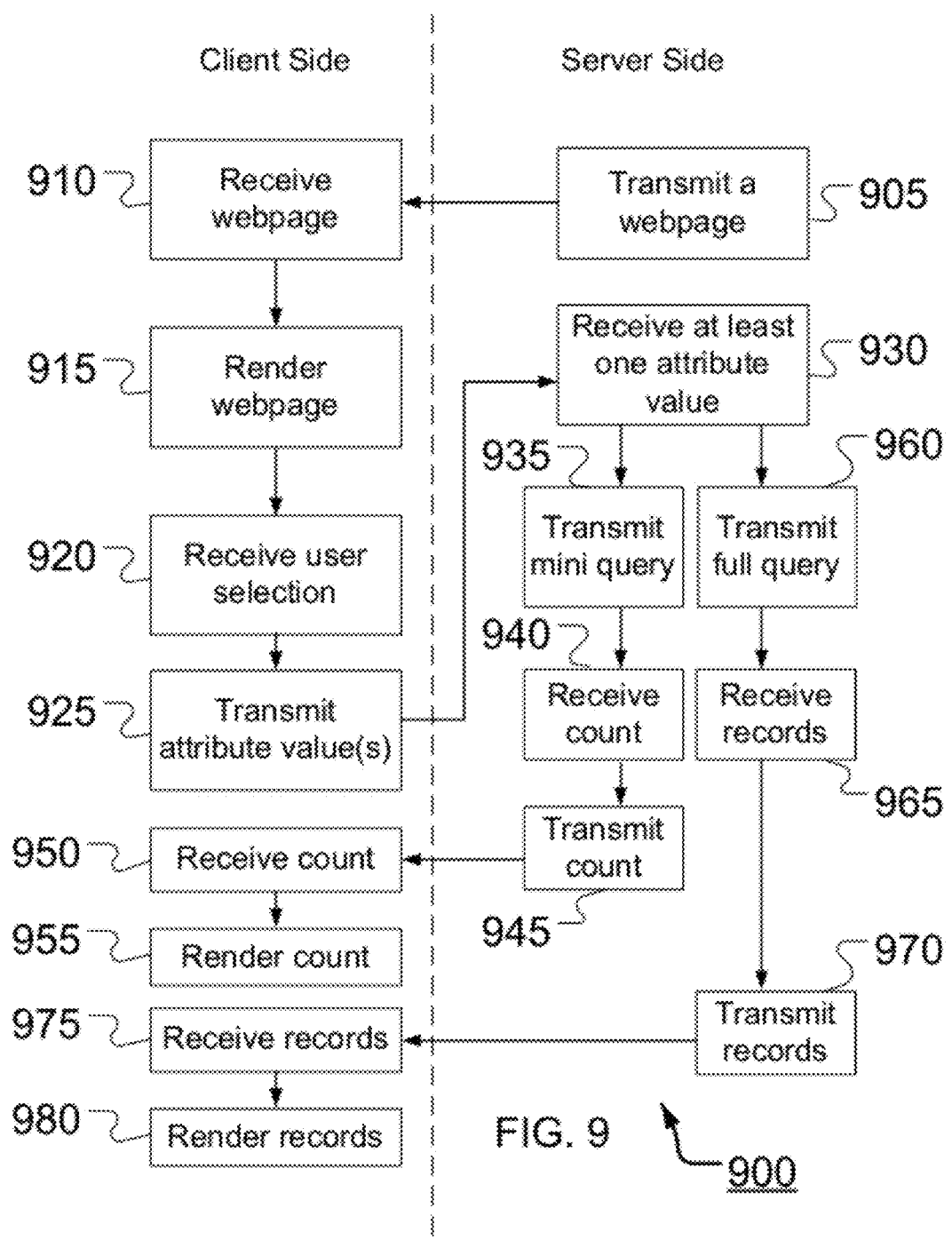
FIG. 9 is a flow chart illustrating a process for generating a count of records that satisfy a set of attribute values for embodiments configured to automatically update the results area and to transmit both a mini query and full query simultaneously.

In other embodiments, a computing device, in response to receiving user input identifying a selection of an attribute value on webpage 600, may transmit both a mini query and a full query (i.e., query for both a count of records and for record indicators) substantially simultaneously. For example, FIG. 9 is a flow chart illustrating a process for generating a count of records that satisfy a set of attribute values for embodiments configured to automatically update the results area and to transmit both a mini query at step 935 and full query at step 960 simultaneously. In FIG. 9, it may take less time to receive a count of records at step 940 in response to transmitting a mini query at step 935 than it may take to receive records at step 965 in response to transmitting a full query at 960. Thus, any or all of steps 945, transmitting the count, 950, receiving the count, and 955, rendering the count, may occur before steps 965, receiving records, 970, transmitting records, 957, receiving records, and 980, rendering records. Because it may take more time to return the record indicators to display in results area 120 than the count of records to display in preview area 130, FIG. 6 shows preview area 130 indicating that there are 81 records for DELL™ notebooks in the catalog while results area 120 awaits results of a catalog query. In such embodiments, if a user decides that they want to redefine their query (e.g., the user decides that the attribute value they selected results in too few records or the user decides to select values for additional attributes to further constrain the records), the user may select any attributes and a computing device may terminate the full query and again transmit both a mini query and a full query corresponding to received redefined user input, either sequentially or substantially simultaneously.

Figure 10:
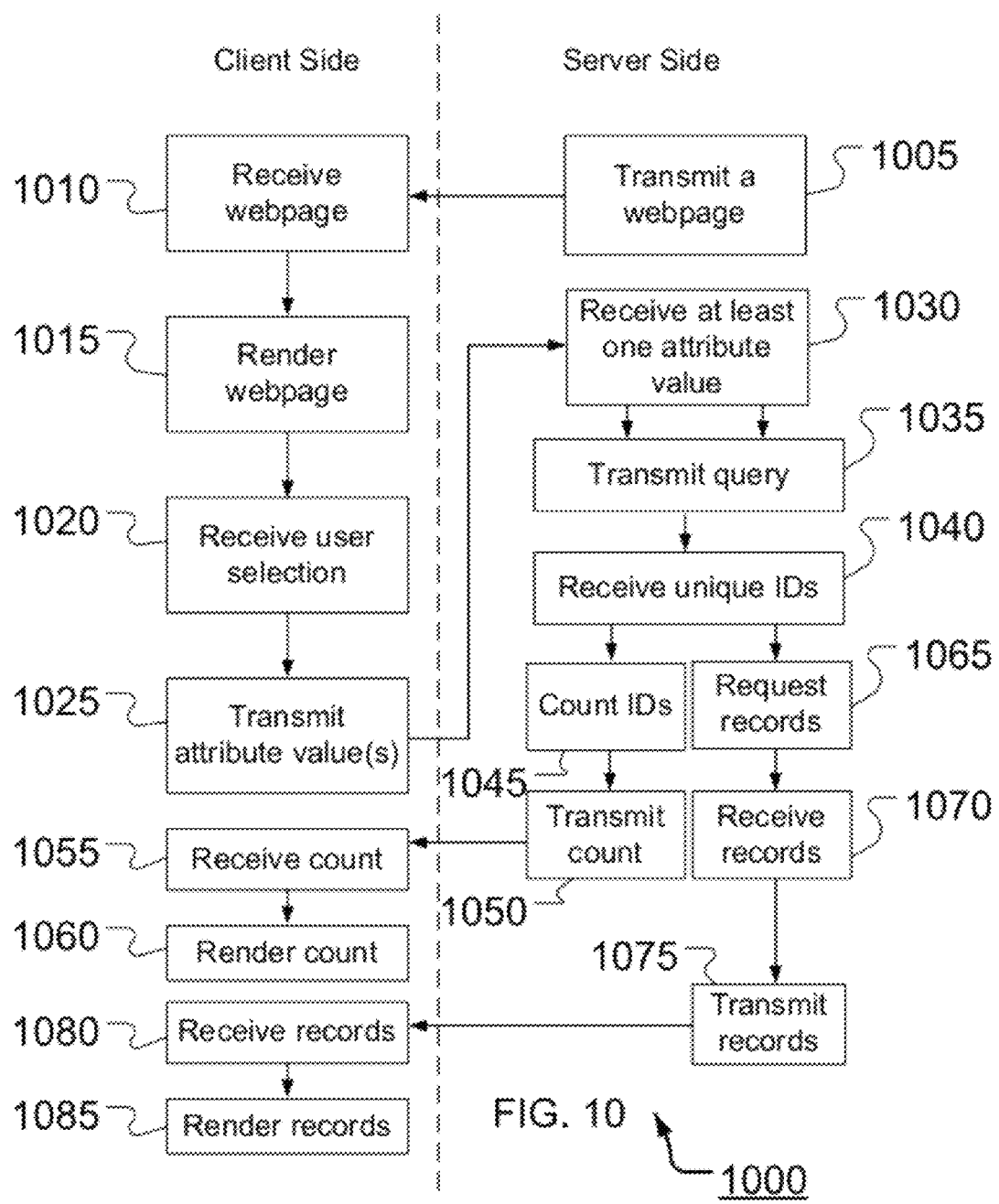
FIG. 10 is a flow chart illustrating a process for generating a count of records that satisfy a set of attribute values for embodiments configured to automatically update the results area and to transmit a single query rather than separate a separate mini and full query.

Of course, in other embodiments, a single query may be transmitted in place of the separate mini and full queries. For example, FIG. 10 is a flow chart illustrating a process for generating a count of records that satisfy a set of attribute values for embodiments configured to automatically update the results area and to transmit a single query rather than a separate mini and full query. At step 1035, a computing device may transmit a query to search all records in a data store to determine which records match one or more selected attribute values. In response, at step 1040, a computing device may receive a unique identifier corresponding to each record having attribute values matching the selected attribute values. At step 1045, a computing device may then count (i.e., sum) the unique identifiers received at step 1040. At step 1050, a computing device may transmit the count. In response to step 1040, a computing device may also request records corresponding to the unique record identifiers at step 1065. At step 1070, records may be received in response to the request. At step 1075, the received records may be transmitted.

For catalog systems that automatically filter results based on receipt of a user's selections, both the sequential method (i.e., the system waits to transmit the full query until it receives a count of records in response to the mini query) and the substantially simultaneous method (i.e., the system transmits the mini query and full query substantially at the same time but may receive the count of records in response to the mini query before receiving record indicators in response to the full query) provide advantages over systems that merely automatically query a catalog for product records having the selected attribute values. Automatically refreshing systems, such as GOOGLE™ Instant by way of analogy, may take a longer time to return results than may be taken to simply return a count of results. By allowing a user to preview a count of results before the results are displayed to the user, the user may proceed to modify the filter in accordance with their search preferences, thereby allowing the user to search more quickly and effectively.

Of course, a webpage may include instructions causing a computing device to automatically transmit a mini query for a count of records in response to other triggers as well. For example, a webpage may instruct a computing device to transmit an attribute value in response to receiving user input of a cursor hovering over that attribute value. The computing device may then receive a count of records corresponding to the attribute value and render the count of records before a user even selects the attribute value. In this fashion, a user may quickly mouse-over various attribute values to see the count of corresponding records without having to select the various values. Additionally, in systems that may automatically refine results in response to a user's selection of an attribute value, this may allow a user to prevent the record indicators from rapidly changing as the user may only be trying to see how many products satisfy various attribute values.

Embodiments may provide other features to allow a user to interact with a data set more intuitively. For example, embodiments may additionally provide recommendations to a user in response to the count. For example, with reference to FIG. 4, if a user selects a value 1 lb or less for the attribute weight and a mini query reveals that there are only two DELL™ notebooks out of the 81 that weigh 1 lb or less, a recommendation may be presented to the user indicating that DELL™ has, for example, 10 notebooks out of the 81 that weigh 2 lb or less. Thus, a user may more intuitively drill-down through a filter chain to arrive at a desired number of results. Similarly, embodiments may provide recommendations for walking out of a filter chain (i.e., removing filter attribute values to broaden a search). Continuing the above example, if a user selects the value 1 lb or less for the attribute weight and a mini query reveals that there are only two DELL™ notebooks out of the 81 that weigh 1 lb or less, a recommendation may be presented to a user indicating that APPLE™ has several notebooks meeting the selected attribute value or indicating the count of all notebooks weighing 1 lb or less independent of the manufacturer. Thus, a user may more intuitively back out of a search.

Other embodiments may provide recommendations to a user based on the user's preferences. For example, a user may indicate that they wish to receive an indication of the filter attribute value that would narrow a search to the greatest extent and the filter attribute value that would narrow a search to the least extent. Of course, any user preferences may be indicated and this is only provided by way of example. Such filter options, including recommendations and preferences, may allow a user to receive a desired count of records so that the user only directs their attention to relevant records and does not need to page through several screens of records. Such searches may be, for example, free text searches of record attributes or could be searches of indexed record attributes.

In addition to displaying a count of records in a preview area, embodiments disclosed herein may use the count of records corresponding to a set of attribute values received in response to an automatic query to assist a user with catalog filtering. For example, if selection of one or more filters results in zero records fulfilling a query of the catalog, a search control may be automatically disabled (e.g., grayed out, colored red, etc.) to prevent a user from wasting time performing a search that will reveal no results. Similarly, embodiments configured to automatically query products may use the count of records received in response to the mini query to display, in the results area, an indication that no products in the catalog satisfy the query. Because the count of records may be received before the record indicators, this may allow a user to more quickly see that no products match the selected filter criteria.

In other embodiments, a user may set a threshold that the count of results must be above or below, or a threshold range for the count of results, in order for a search or full query to be submitted. For example, a user may specify that they wish to receive at least a minimum threshold number of records, such as ten, at most a maximum threshold number of records, such as fifty, or a threshold range of numbers, such as between ten and fifty. Of course, a threshold may be pre-determined, for example a threshold or threshold range may be defined for a particular website. Alternatively, a threshold may be determined based on a user's past viewing habits, for example, if a user tends to only browse the first three pages of records when each page shows ten records, a system may determine a maximum threshold for the user to be thirty.

The embodiments shown in FIGS. 1, 3, 5, and 6 show a UI having preview area 130 configured as a floating box following the mouse curser. These embodiments may be configured to only display preview area 130 when the mouse curser is over a determined area, for example search area 110. In this fashion, a user may see a preview count of search results when they are in the process of selecting or de-selecting attribute values, but may avoid having a portion of the UI blocked by the preview area at other times. Thus, a user may receive additional information to assist in formulating filters when filtering results and may have the additional information hidden when performing tasks unrelated to that information. Other embodiments may provide a preview area in any other location on the webpage, for example in a static location within search area 110.

Automatic catalog search preview generation may provide additional advantages. For example, a web server may use attribute values to determine content (e.g., ads or other creatives) to display or refresh on a webpage. Website 100 of FIG. 1 may display content 140, such as an ad. When a computing device first renders website 100, content 140 may be selected based on the general content of the site, for example content 140 may be an ad relating to notebook computers. In response to receipt of user input indicating a selection of attribute values, content 140 may be refreshed to include an ad according to business objectives based on selected attribute values. For example, content 140 may be refreshed to include an ad that corresponds with the user's selections (e.g., show a DELL™ ad if a user selects DELL™ as an attribute value to help reinforce the user's presumed preference), an ad for a competitor of the user's selections (e.g., an APPLE™ ad if a user selects DELL™ as an attribute value to attempt to change the user's assumed preference), or an ad for a review site (e.g., show a CNET™ ad to assist a user in comparing competing products). A web server, for example web server 510 of FIG. 5, may store ad content locally and may, for example, query a local ad database and transmit ad content to be rendered in a webpage corresponding to attribute values. Alternatively, web server 510 may query a remote computing device, such as ad server 550, and may receive in response to the query ad content to be rendered in a website corresponding to attribute values. Further, ad content may be stored in the same catalog as the records and record attributes and may be received automatically in response to either a mini query for a count of records or a full query for record indicators.

Further, while the above disclosure generally refers to systems and methods for filtering an electronic catalog, similar methods and systems may be useful to preview a count of results of a search of an electronic catalog, such as a plain language search or a Boolean search. For example, search area 120 of FIG. 1 may include a text box configured to allow a user to search a catalog by entering a search phrase. Such embodiments may automatically transmit search terms and receive a preview of the count of records that have attribute values satisfying the search terms before a search is performed for record indicators. The automatic transmission may be triggered after each character a user inputs, after each space (i.e., after each indication a word has been input), or periodically (e.g., after a determined time, in response to a determined user activity, after a number of key strokes, etc.). Additionally, a predictive function may be applied to automatically provide the count of records that have attributes satisfying a word that a user has begun to input. For example, if a user has input "netb" as the beginning of a search term relating to notebook computers, a predictive function may predict that a user is inputting the attribute value "netbook", transmit the "netbook" attribute value, receive a count of records having the "netbook" attribute value, and render the count of records.

Of course, embodiments shown in FIGS. 1, 3, 5, and 6 show an exemplary UI and other UIs may be used with the disclosed embodiments. The mini query and full query disclosed herein may be implemented with any interface to assist users with intuitively searching or filtering a data set.

Figure 7:
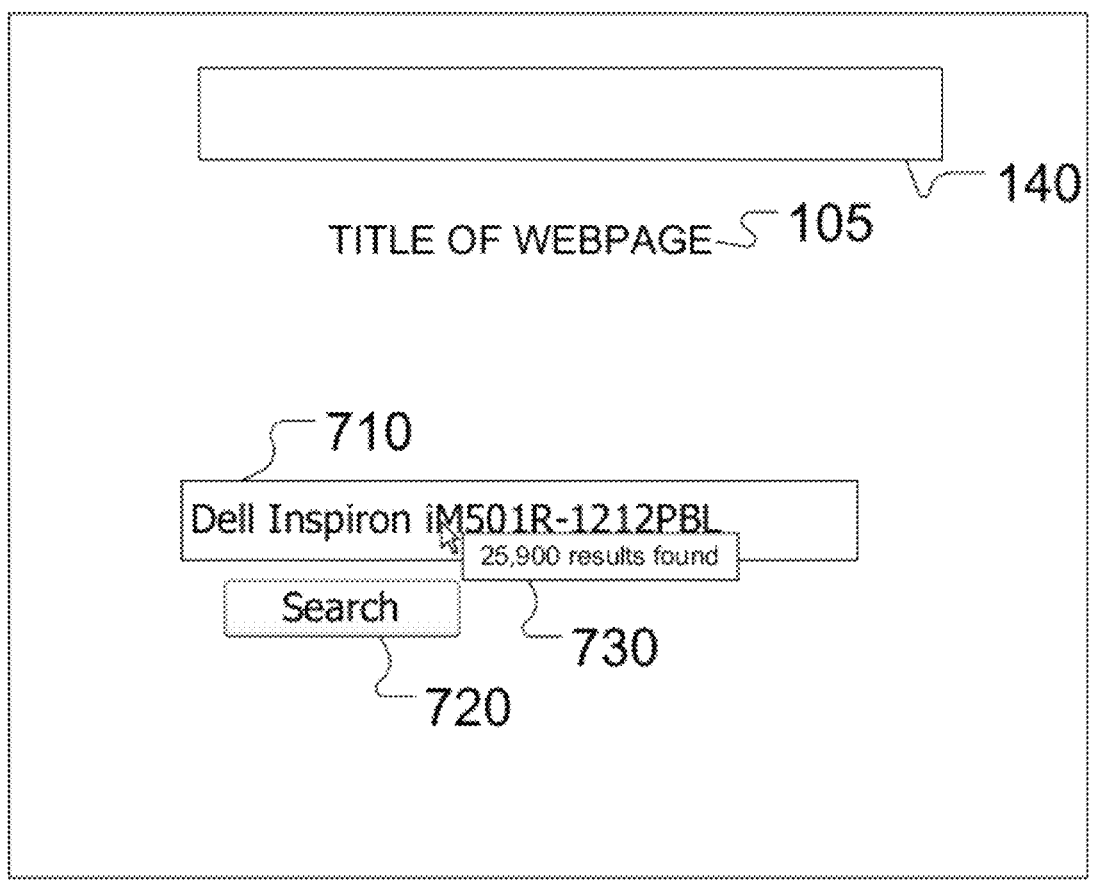
FIG. 7 is a schematic illustration of an exemplary search webpage.

Alternatively, FIG. 7 shows an exemplary webpage 700 configured to allow a user to enter search terms in text field 710 and perform the search by selecting search button 720. Prior to a user selecting the search button 720, a mini query may be made to a database for a count of results correlating to the search terms and that count may be displayed to the user in a preview area 730. As illustrated by FIG. 7, while embodiments disclosed herein may be particularly useful for filtering and navigating an electronic product catalog, one of ordinary skill in the art understands that embodiments disclosed herein may be applied to other filtering and search processes and systems.

Embodiments may also implement caching strategies and caching functions to improve performance of searching or filtering a data set. For example, mini queries and/or full queries may be performed on a data set prior to a user interacting with a UI. In such instances, results of the queries may be cached and the cached query results may be transmitted in response to receipt of a search (e.g., selection of a filter record attribute) from a user.

Embodiments described herein frequently refer to databases, data stores, and the like. These terms are used generally to describe any data set, such as a structured data source, including indexes, hashes, databases, data stores or other systems for storing data.

The invention has been described through embodiments. However, various modifications can be made without departing from the scope of the invention as defined by the appended claims and legal equivalents.

What is claimed is:

1. A computer-implemented method performed by one or more computing devices for providing navigation of a database comprising a plurality of records having attributes, the method comprising:
    transmitting, by at least one of the one or more computing devices, a webpage configured to display selectable filters associated with record attributes;
    receiving, by at least one of the one or more computing devices, at least one attribute value based on a first user interaction with the webpage;
    transmitting, by at least one of the one or more computing devices, a mini query to the database for a count of records in the database that satisfy the at least one attribute value;
    receiving, by at least one of the one or more computing devices, said count of records;
    transmitting, by at least one of the one or more computing devices, said count of records;
    transmitting, by at least one of the one or more computing devices, a full query to the database for record indicators in said database that satisfy the at least one attribute value;
    receiving, by at least one of the one or more computing devices, said one or more record indicators; and
    transmitting, by at least one of the one or more computing devices, said one or more record indicators,
    wherein said step of transmitting said count of records occurs before said step of transmitting said record indicators.

2. The computer-implemented method of claim 1, wherein said step of transmitting the mini query and said step of transmitting the full query occur substantially simultaneously.

3. The computer-implemented method of claim 1, wherein said database is a product catalog and wherein said records are product records having product attribute values stored therein.

4. The computer-implemented method of claim 1, further comprising:
    receiving an indication of a second user interaction with the webpage,
    wherein said step of transmitting the full query occurs after said receiving the second user interaction.

5. The computer-implemented method of claim 1, further comprising:
    transmitting a content request including said at least one attribute value;
    receiving content corresponding to said at least one attribute value; and
    transmitting said content to be rendered in a content area.

6. The computer-implemented method of claim 1, further comprising receiving one or more recommendation for an additional filter selection.

7. The computer-implemented method of claim 1, wherein if in said step of receiving the count of records said count of records is one of above a threshold value, below a threshold value, and outside a threshold range, said method further comprises receiving at least another attribute value based on a filter selection, and wherein said step of receiving at least another attribute value occurs before said step of transmitting a full query.

8. The computer-implemented method of claim 1, wherein said step of transmitting a mini query comprises:
    searching said plurality of records to determine which records have a record attribute value matching the at least one attribute value;
    receiving a unique identifier corresponding to each of said plurality of records having a record attribute matching the at least one attribute value;
    counting the received unique identifiers; and
    returning the count of received unique identifier values.

9. The computer-implemented method of claim 8, wherein said step of transmitting a full query comprises:
    searching said plurality of records to determine which records have a record attribute value matching the at least one attribute value;
    receiving a unique identifier corresponding to each of said plurality of records having a record attribute matching the at least one attribute value;
    retrieving the records corresponding to the unique identifiers;
    processing the retrieved records; and
    returning the processed retrieved records.

10. The computer-implemented method of claim 1, further comprising:
    computing one or more recommendation based on said count;
    transmitting the one or more recommendation for an additional filter selection.

11. A computer-implemented performed by one or more computing devices method for providing navigation of a database comprising a plurality of records having attributes, the method comprising:
    transmitting, by at least one of the one or more computing devices, a webpage configured to display selectable filters associated with record attributes;
    receiving, by at least one of the one or more computing devices, at least one attribute value based on a first user interaction with the webpage;

transmitting, by at least one of the one or more computing devices, a query to the database for records in the database that satisfy the at least one attribute value;
receiving, by at least one of the one or more computing devices, unique identifiers of records satisfying the query;
summing, by at least one of the one or more computing devices, the received unique identifiers;
transmitting, by at least one of the one or more computing devices, a total of said summing;
transmitting, by at least one of the one or more computing devices, a request for one or more record identified by the received unique identifiers;
receiving, by at least one of the one or more computing devices, the requested one or more records; and
transmitting, by at least one of the one or more computing devices, the received one or more records;
wherein said step of transmitting said total occurs before said step of transmitting said records.

12. A computer-implemented method performed by one or more computing devices for facilitating user navigation of a database comprising a plurality of records having attributes, the method comprising:
receiving, by at least one of the one or more computing devices, a webpage including selectable filters associated with record attributes;
rendering, by at least one of the one or more computing devices, said webpage on the display device;
receiving, by at least one of the one or more computing devices, a user interaction with at least one filter from a user input device;
transmitting, by at least one of the one or more computing devices, one or more attribute values corresponding to the user interaction;
receiving, by at least one of the one or more computing devices, a count of records; rendering, by at least one of the one or more computing devices, said count of records in the webpage;
receiving, by at least one of the one or more computing devices, a plurality of record indicators corresponding to the user interaction; and
rendering, by at least one of the one or more computing devices, said record indicators in the webpage,
wherein said step of receiving a count of records occurs before said step of receiving said record indicators.

13. The computer-implemented method of claim 12, further comprising:
receiving content corresponding to said at least one attribute value; and
rendering, on a display device, said content in a content area.

14. A non-transitory computer-readable medium having computer readable code stored thereon that, when executed by a computing device, performs the method:
receiving, with a by the computing device, a webpage configured to display selectable filters associated with record attributes;
rendering, by the computing device, said webpage on the display device;

receiving, by the computing device, a user interaction with at least one filter from a user input device;
transmitting, by the computing device, one or more attribute values corresponding to one or more selected filter;
receiving, by the computing device, a count of records to be rendered in a preview area;
rendering, by the computing device, said count of records in said preview area;
receiving, by the computing device, said record indicators to display in a results area; and
rendering, by the computing device, said record indicators in said results area,
wherein said step of receiving a count of records occurs before said step of receiving said record indicators.

15. The computer-readable code of claim 14, wherein said preview area is a floating area configured to trail a curser.

16. A computer system comprising:
a processor, configured to:
transmit a webpage having a search control configured to search a data set;
receive at least one search value;
transmit a mini query for a count of records in the data set that satisfy the search value;
receive said count of records;
transmit, to be rendered in the webpage, said count of records;
transmit a full query for records in the data set that satisfy the search value;
receive said records; and
transmit, to be rendered in the webpage, said records;
wherein said step of transmitting said count of records occurs before said step of transmitting said records, and
memory coupled to the processor, the memory configured to store said search value and said count of records.

17. The computer system of claim 16, wherein said step of transmitting a mini query comprises:
searching said data set to determine which records have a record attribute value matching the at least one search value;
receiving a unique identifier corresponding to each record having a record attribute matching the at least one search value;
counting the received unique identifiers; and
returning the count of received unique identifier values.

18. The computer system of claim 17, wherein said step of transmitting a full query comprises:
searching said data set to determine which records have a record attribute value matching the at least one search value;
receiving a unique identifier corresponding to each record having a record attribute matching the at least one search value;
retrieving the records corresponding to the unique identifiers;
processing the retrieved records; and
returning the processed retrieved records.

* * * * *